3,379,782
PROCESS FOR PREPARING POLYALKYL-
TETRAHYDRONAPHTHALENES
Samuel J. Kahn, Rutherford, N.J., assignor to Universal
Oil Products Company, Des Plaines, Ill., a corporation
of Delaware
No Drawing. Filed Aug. 27, 1965, Ser. No. 483,316
7 Claims. (Cl. 260—668)

ABSTRACT OF THE DISCLOSURE

Preparation of polyalkyltetrahydronaphthalene by reacting a 2,3-dimethylbutene with an alpha-methylstyrene in the presence of an activated clay catalyst at a temperature of 65°–120° C.

---

This invention relates to a process for preparing polyalkyltetrahydronaphthalenes and more particularly to a process for preparing 1,1,3,4,4-pentamethyl-6-alkyltetrahydronaphthalenes.

Polyalkyl substituted 1,2,3,4-tetrahydronaphthalenes are valuable compounds, particularly in the perfume industry, due to the fact that these compounds, upon acylation, have odors which closely resemble the highly expensive, naturally occurring macrocyclic musks such as muscone or civetone.

Heretofore, polyalkyltetrahydronaphthalenes and especially polyalkyltetrahydronaphthalenes which are acylated for use in perfumery have been prepared principally either by a cyclialkylization method such as, for example, the condensation of a 2,5-dihalo-2,5-dimethylhexane with an alkyl substituted benzene in the presence of a Friedel-Crafts catalyst or by a cyclodehydration method such as, for example, the cyclization of a tertiary alcohol such as 1,1,2,4-tetramethyl-4-(p-tolyl)-pentanol in the presence of an acid catalyst. Another method of synthesis which recently has become of interest primarily due to the fact that the specific type of polyalkyltetrahydronaphthalenes produced thereby, upon acylation, possesses an extremely desirable musk-like odor is a method which utilizes a p-cymylcarbonium ion intermediate. In this method of synthesis, a p-cymylcarbonium ion, formed either by a hydride transfer from p-isopropyltoluene, or by the addition of a proton to dimethyl-p-tolylcarbinol or p-α-dimethylstyrene, is reacted in the presence of a strong acid catalyst such as concentrated sulfuric acid at a low temperature in the order of 0° to 30° C. with olefins or alcohols such as 2,3-dimethylbutenes or 2,3-dimethyl-2-butanol to form the polyalkyltetrahydronaphthalene.

While the p-cymylcarbonium ion method of synthesis is the most straightforward method for preparing the polyalkyltetrahydronaphthalenes having the most desirable structure, namely 1,1,3,4,4,6-hexaalkyl-1,2,3,4-tetrahydronaphthalene for subsequent acylation to obtain compounds possessing fine musk-like odors, it nevertheless has not found wide commercial acceptance. The principal reason for this is that the reaction is extremely costly to carry out mostly due to the fact that the conversion of the very expensive reactants to product is very low, in the order of about 30 percent, and moreover, even the small amount of product produced is very difficult and costly to recover in pure form from the reaction mass containing copious quantities of side products. This serious problem of high cost is also seriously compounded by the fact that the unreacted, highly expensive 2,3-dimethylbutene starting materials are not recoverable for reuse in any appreciable quantities because of their substantial consumption in the formation of product contaminating side products. It has now been discovered, however, that polyalkyltetrahydronaphthalenes may be produced in high conversions according to the carbonium ion method of syntheses, and moreover, in remarkably good yields with recoverable and reusable 2,3-dimethylbutene starting materials by utilizing an activated, naturally occurring clay catalyst at unusually high temperatures to effect the reaction of a substituted styrene compound and a 2,3-dimethylbutene.

Accordingly, an object of this invention is to provide a process for preparing polyalkyltetrahydronaphthalenes useful as intermediates in the preparation of acylated polyalkyltetrahydronaphthalenes having fine musk-like odors. Another object is to provide a process for preparing polyalkyltetrahydronaphthalenes involving the reaction of a substituted styrene and 2,3-dimethylbutene which is effected within an elevated temperature range in the presence of an activated, naturally occurring clay. A still further object is to provide a process for preparing polyalkyltetrahydronaphthalenes involving the reaction of a substituted styrene and a 2,3-dimethylbutene at elevated temperatures in the presence of an activated, naturally occurring clay catalyst whereby the tetrahydronaphthalene produced is obtained economically in high yield simultaneously with readily recoverable and reusable dimethylbutene starting materials. Other objects of this invention will become apparent from the following further detailed description thereof.

The polyalkyltetrahydronaphthalenes prepared according to the process of this invention may be represented by the following structural formula:

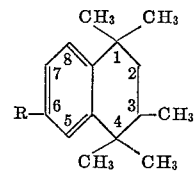

in which R is hydrogen or a lower alkyl radical of from 1 to about 5 carbon atoms. Examples of polyalkyltetrahydronaphthalenes having this structure include: 1,1,3,4,4-pentamethyl-1,2,3,4-tetrahydronaphthalene; 1,1,3,4,4,6-hexamethyl-1,2,3,4-tetrahydronaphthalene; 1,1,3,4,4-pentamethyl - 6 - ethyl-1,2,3,4-tetrahydronaphthalene; 1,1,3,4,4-pentamethyl-6-isopropyl-1,2,3,4 - tetrahydronaphthalene; or 1,1,3,4,4-pentamethyl-6-tertiarybutyl-1,2,3,4-tetrahydronaphthalene.

The polyalkyltetrahydronaphthalenes having the above general structure are prepared according to the process of this invention, as hereinbefore indicated, by reacting a substituted styrene compound with a 2,3-dimethylbutene at a temperature within the range of from about 65° to 120° C. in the presence of an activated, naturally occurring clay. The substituted styrene compounds which may be used in this reaction have the following structural formula:

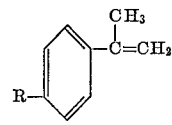

wherein R has the same meaning as above. Examples of the substituted styrene compounds include α-methylstyrene; p-α-dimethylstyrene; p-ethyl-α-methylstyrene; p-isopropyl-α-methylstyrene; or p - tertiarybutyl-α-methylstyrene. The styrene compounds need not be of extremely high purity and conveniently relatively impure mixtures containing as low as 80 percent of the styrene compound may be readily utilized in the process of this invention without substantial reduction in product yield.

The 2,3-dimethylbutene reactant which may be used in the process of this invention comprises either 2,3-dimethylbutene-1 or 2,3-dimethylbutene-2 or mixtures thereof. While the 2,3-dimethylbutene-1, according to carbonium ion theory, is the olefin isomer required for the reaction, it is possible to also use 2,3-dimethylbutene-2 inasmuch as the 2-isomer will rearrange by isomerization under the conditions of the process of this invention to form the 2,3-dimethylbutene-1. Accordingly, the 2,3-dimethylbutene reactant may comprise either the 1 or 2 isomer or any mixture thereof. Conveniently, a suitable 2,3-dimethylbutene reactant comprising a mixture of the 1 and 2 isomers may be readily obtained from the dehydrohalogenation and isomerization of neohexyl chloride.

The reaction of the substituted styrene compound and the 2,3-dimethylbutene reactant according to the process of this invention may be illustrated by the following equation using, for illustrative purposes only, p-α-dimethylstyrene as the styrene reactant to form 1,1,3,4,4,6-hexamethyl-1,2,3,4-tetrahydronaphthalene:

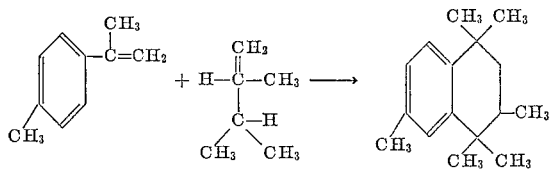

It is, of course, obvious from the above equation that different polyalkyltetrahydronaphthalenes will be produced depending upon the particular styrene compound used in the reaction. For example, if p-ethyl-α-methylstyrene is used then 1,1,3,4,4-pentamethyl-6-ethyl-1,2,3,4-tetrahydronaphthalene will be produced, and if p-isopropyl-α-methylstyrene then 1,1,3,4,4-pentamethyl-6-isopropyl-1,2,3,4-tetrahydronaphthalene will be produced.

The catalysts which are used in combination with the elevated temperature range according to the process of this invention to achieve the highly desirable results of producing excellent yields of polyalkyltetrahydronaphthalene simultaneously with readily recoverable and reusable, unreacted 2,3-dimethylbutene starting materials comprise activated, naturally occurring clays. These clays, in general, are hydrated alumina silicates which contain various proportions of silica and alumina and often also various admixtures of the oxides of iron, magnesium, titanium or calcium and which have been chemically activated by a treatment with a mineral acid such as sulfuric or hydrochloric acid. These clays in general include the various types of bentonite clays such as the montmorillonite type clays, generally described as a subclass or mineral constituent of bentonite clays, which are found throughout the world, although obtained commercially chiefly from deposits in Germany and the western parts of the United States. Other types of clays, such as the halloysites and the kaolinites as well as fullers earth or the attapulgite type clays may be used in the process although the results obtained are not generally as desirable as those obtained with the montmorillonite type clays.

The acid activation of these clays is well known to those skilled in the art and is described in many technical articles and patents such as BIOS Final Rep. 398, p. 4, Proceedings of Süd-Chemie, A. G. Houben-Weyl, Methoden der Organischen Chemie, 4th ed., vol. 4, pt. 2, p. 149 (1955); Science of Petroleum, 3: 1699–1705 (1938), and United States Patents No. 2,671,058 and No. 1,642,871. This acid activation treatment is effected in general by slurrying the raw clay with aqueous sulfuric or hydrochloric acid at high temperatures followed by filtering and washing the residue and finally drying at high temperatures.

The montmorillonite type clays which are preferably used in the process of this invention are readily available commercially in activated form under such trade names as "Super Filtrol" or "Tonsil." Typical analysis of "Super Filtrol" which is activated with sulfuric acid and "Tonsil" which is activated with hydrochloric acid are as follows:

SUPER FILTROL

| Component: | Weight percent |
| --- | --- |
| $SiO_2$ | 66.6 |
| $Al_2O_3$ | 15.4 |
| $MgO$ | 4.3 |
| $Fe_2O_3$ | 2.3 |
| $CaO$ | 2.2 |
| $TiO_2$ | 0.4 |
| $SO_3$ | 3.0 |
| Volatiles | 3.8 |

TONSIL

| Component: | Weight percent |
| --- | --- |
| $SiO_2$ | 72.5 |
| $Al_2O_3$ | 14.0 |
| $MgO$ | 1.5 |
| $Fe_2O_3$ | 4.0 |
| $CaO$ | 0.8 |
| Volatiles | 7.2 |

Since the activated clay catalysts used in the process of this invention have a tendency to readily absorb moisture, it is necessary that precautions be taken to assure that the moisture content of the catalysts does not substantially exceed above about 15 percent by weight. Moisture levels above this quantity have a tendency to unfavorably affect the reaction.

While the process of this invention may be effected without the use of a solvent, more desirable results are obtained when a solvent is utilized. Such solvent may comprise excess 2,3-dimethylbutenes, or more preferably, an aromatic hydrocarbon, such as, benzene or toluene. The use of such aromatic solvent, however, at the elevated temperatures used in the process of this invention is most surprising, as it normally would be expected that the 2,3-dimethylbutene reactant would be consumed through alkylation of the aromatic solvent and thus lower the product yield and preclude the recovery of any unreacted 2,3-dimethylbutenes not consumed in the tetrahydronaphthalene formation. Actually, however, such is not the case as there is little, if any, 2,3-dimethylbutene alkylation of the aromatic solvent; and the 2,3-dimethylbutenes, not reacted in the tetrahydronaphthalene formation, are readily recoverable.

As hereinbefore indicated the temperature at which the reaction is effected is very important to the success of the process. The temperature which is used must be above about 65° C. and should not substantially exceed above about 120° C. The use of temperatures outside this range and, in particular, below this range results in a substantial reduction in the yield of tetrahydronaphthalene obtained. Advantageously, the reaction is effected under atmospheric pressures at the refluxing temperature of the mixture which may be conveniently regulated by the use of an aromatic solvent of the above described class. The most preferable temperature within the above range utilized for the reaction will vary, depending upon such factors as the particular reactants used, the type of solvent, if any, present in the mixture and the particular clay catalyst utilized. Generally, however, when using benzene as solvent and a catalyst such as a hydrochloric acid activated montmorillonite clay the temperature range is preferably maintained within the range of from about 70° to 85° C. for optimum results.

The use of such relatively high temperatures in the process of this invention is most surprising as it was heretofore necessary in the preparation of polyalkyltetrahydronaphthalenes involving the reaction of 2,3-dimethylbutenes with styrenes to effect the reaction at very low temperatures of the order of about 0° to 30° C., to prevent the olefins from polymerizing and the styrenes from dimerizing to the severe detriment of the polyalkyltetrahydronaphthalene formation. A possible explanation for this is that the clay catalyst used at the high temperature of the process of this invention in some way favor the reaction of the 2,3-dimethylbutene and the styrene to form the desired polyalkyltetrahydronaphthalene and not the side reactions of polymerization and dimerization of the reactants in a deleterious manner.

The ratio of the reactants used in the process of this invention is not critical, and generally a stoichiometric quantity of about one mol of the styrene compound to about one mol of the 2,3-dimethylbutene may be conveniently utilized. When a solvent is utilized, and preferably ical and the amount used will vary depending upon such factors as the particular catalyst used, the reactants and the reaction rate desired. Generally, however, the amount of catalyst may range from about 2 to 50 percent by weight of the 2,3-dimethylbutene reactants with amounts ranging from about 5 to 10 percent generally being more conveniently utilized. When a solvent is utilized, and preferably an aromatic such as benzene, the amount of solvent should at least be sufficient to render the mixture of reactants and clay catalyst readily stirrable. Generally, about one half to one weight part of solvent per one part of styrene compound is suitable for this purpose.

In carrying out the process of this invention, which is effected preferably in a batch-type operation, while it is possible to charge the reactants and catalyst to a reaction vessel and heat the mixture to the essential temperature range at atmospheric pressures, a highly preferred procedure for optimizing results is to charge the catalyst, solvent, if used, and 2,3-dimethylbutene to the reaction vessel, heat the mixture to the desired temperature range and then gradually add the styrene compound to the stirred mixture maintained at the desired temperature. The optimum addition time of the styrene will vary depending upon such factors as the reaction temperature and the particular catalyst used, but generally ranges from about 1 to 5 hours and preferably about 3 hours. After the styrene addition is complete the reaction mixture is maintained at the desired temperature for a period of time sufficient to complete the reaction; a period usually ranging from about 1 to 5 hours with the shorter period of about one hour being required for more active catalysts.

When the reaction is completed, the product mixture is separated from the catalyst by conventional methods such as decantation or filtration which, because the catalyst used in the process is a solid, is readily and economically achieved. Because of the uniqueness of the process of this invention which permits the formation of large quantities of tetrahydronaphthalene product without destruction of the valuable unreacted 2,3-dimethylbutenes in forming large amounts of tetrahydronaphthalene contaminating side products, the tetrahydronaphthalene product, the unreacted 2,3-dimethylbutenes and the solvent may be readily recovered from the catalyst free-product mixture by simple fractionation. The tetrahydronaphthalene fraction may then be recrystallized from a solvent such as isopropyl alcohol to obtain a high yield of pure polyalkyltetrahydronaphthalene.

As hereinbefore indicated, the process of this invention, effected with an activated clay catalyst at highly elevated temperatures, has the amazing characteristic of permitting the reaction to take place principally between the styrene and the 2,3-dimethylbutene to form the desired polyalkyltetrahydronaphthalene with little or no loss of the unreacted 2,3-dimethylbutene through side product formation or alkylation of the aromatic solvent. This results in the highly desirable feature of being able to recover the 2,3-dimethylbutenes for reuse which adds considerably to the overall desirability of the process of this invention by greatly lowering the cost of preparing polyalkyltetrahydronaphthalenes.

The polyalkyltetrahydronaphthalenes prepared according to the process of this invention as hereinbefore indicated may be acylated to obtain acylated polyalkyltetrahydronaphthalenes having very fine, musk-like odors which render them highly valuable for use in perfumery. The acylation may be effected according to conventional methods such as by reacting the polyalkyltetrahydronaphthalenes with an acyl halide or acid anhydride in the presence of an acid-acting catalyst. Examples of the acylated polyalkyltetrahydronaphthalenes include 7-acetyl - 1,1,3,4,4,6-hexamethyl - 1,2,3,4 - tetrahydronaphthalene or 7-acetyl-1,1,3,4,4-pentamethyl - 6 - ethyl - 1,2,3,4-tetrahydronaphthalene.

The following examples are given to illustrate the process of this invention, but they are not intended to limit the generally broad scope of this invention in strict accordance therewith:

Example I 1,1,3,4,4,6 - hexamethyl 1,2,3,4 - tetrahydronaphthalene was prepared according to the process of this invention by the following procedure:

About 875 grams of benzene, about 465 grams of an olefinic mixture containing about 90 percent by weight of a mixture of the 1 and 2 isomers of 2,3-dimethylbutene (5.0 mols) and about 35 grams of an activated montmorillonite clay (Tonsil IFF) having a moisture content of about 14.9 percent were charged to a reaction flask equipped with heating and stirring means. The mixture was heated with stirring to a reflux temperature of about 71° C. Then about 750 grams of a crude p-α-dimethylstyrene (88 percent by weight, 5 mols) were slowly added by means of an addition funnel to the refluxing mixture over a period of about three hours, with the refluxing temperature rising up to about 80° C. at the completion of the addition. The reaction mixture was then refluxed for about 4 hours to complete the reaction with the refluxing temperature ultimately rising to about 81.5° C. The liquid reaction product was decanted from the catalyst layer to recover about 2090 grams of a liquid product mixture. The mixture was treated with about 5 grams of sodium carbonate and then fractionated under vacuum to recover about 1005 grams of a benzene-2,3-dimethylbutene fraction analyzing by gas-liquid chromatography (G.L.C.) as containing 18.3 percent of 2,3-dimethylbutenes or 2.19 mols and about 566 grams of a product fraction analyzing by G.L.C. as containing 76.5 percent of tetrahydronaphthalene or 2.0 mols. Accordingly, the yield of tetrahydronaphthalene on consumed 2,3-dimethylbutenes was 71.2 percent and the conversion was 40 percent.

The tetrahydronaphthalene product was recovered from the product fraction by mixing the fraction with about 566 grams of isopropyl alcohol at 50° C. followed by cooling to about 0° C. The solid tetrahydronaphthalene product was then filtered from the alcohol solution and dried to recover about 317 grams of 1,1,3,4,4,6-hexamethyl - 1,2,3,4 - tetrahydronaphthalene of 98.6 percent purity having a melting point of 65° to 66° C.

Example II 1,1,3,4,4,6 - hexamethyl - 1,2,3,4-tetrahydronaphthalene was prepared according to the process of this invention by the following procedure:

About 700 grams of benzene, about 336 grams (4 mols) of a mixture of the 1 and 2 isomers of 2,3-dimethylbutene and about 28 grams of an activated montmorillonite clay (Super Filtrol) having a moisture content of about 9.3 percent were charged to a reaction flask equipped with heating and stirring means. The mixture was heated with stirring to a reflux temperature of about 71° C. Then about 560 grams of a distilled p-α-dimethylstyrene (95 percent by weight, 4 mols) were slowly added over a period of about three hours by means of an addition funnel to the refluxing mixture with the refluxing temperature rising up to about 83° C. at the completion of the addition. The reaction mixture was then refluxed for about an hour to complete the reaction. The liquid reaction product was decanted from the catalyst layer to recover about 1596 grams of liquid product mixture. The mixture was treated with about 5 grams of sodium carbonate and then fractionated under vacuum to recover about 780 grams of a benzene-2,3-dimethylbutene fraction analyzing by G.L.C. as 18.0 percent 2,3-dimethylbutenes or 1.67 mols and about 483 grams of a product fraction analyzing by G.L.C. as 78.6 percent tetrahydronaphthalene or 1.76 mols. The yield of tetrahydronaphthalene on consumed 2,3-dimethylbutenes was 75.5 percent and the conversion was 44 percent.

The tetrahydronaphthalene product was recovered from the product fraction by mixing the fraction with about 483 grams of isopropyl alcohol at about 50° C. followed by cooling to 0° C. The solid tetrahydronaphthalene product was then filtered from the alcohol solution and dried to recover about 320 grams of 1,1,3,4,4,6-hexamethyl-1,2,3,4-tetrahydronaphthalene of 99.5 percent purity having a melting point of 66.5 to 67° C.

Example III 1,1,3,4,4 - pentamethyl - 6 - ethyl - 1,2,3,4 - tetrahydronaphthalene is prepared according to the process of this invention by the following procedure:

About 875 grams of benzene, about 465 grams of an olefinic mixture containing about 90 percent by weight of a mixture of the 1 and 2 isomers of 2,3-dimethylbutenes (5.0 mols) and about 35 grams of an activated montmorillonite clay (Tonsil IFF) having a moisture content of about 14.9 percent are charged to a reaction flask equipped with heating and stirring means. The mixture is heated with stirring to reflux temperature and then about 730 grams (5.0 mols) of p-ethyl-α-methylstyrene are slowly added by means of an addition funnel to the refluxing mixture over a period of about three hours, while maintaining refluxing temperature. The reaction mixture is thereafter refluxed for about 4 hours to complete the reaction. The liquid reaction product is decanted from the catalyst layer to recover a liquid product mixture. The mixture is treated with about 5 grams of sodium carbonate and then fractionated under vacuum to recover a benzene-2,3-dimethylbutene fraction and a liquid product fraction boiling at 102–105° at 2 mm. Hg and having a refractive index of $n_D^{20}$ 1.515 to 1.516.

Example IV

This example is cited to demonstrate the unusual property of the process of this invention of achieving a high production of polyalkyltetrahydronaphthalenes without destroying the valuable unreacted 2,3-dimethylbutene starting material which thus permits the ready reuse of the 2,3-dimethylbutenes. In Parts A and B of this example 1,1,3,4,4,6 - hexamethyl-1,2,3,4-tetrahydronaphthalene was produced using 2,3 - dimethylbutene - benzene charges recovered from prior preparations using in Part A Tonsil as the catalyst and in Part B Super Filtrol as catalyst.

Part A: About 956 grams of the benzene-2,3-dimethylbutene fraction recovered from Example I containing about 18.3 percent of a mixture of the 1 and 2 isomers of 2,3-dimethylbutene and about 35 grams of an activated montmorillonite clay catalyst (Tonsil IFF) having a moisture content of about 14.9 percent were charged to a reaction flask equipped with heating and stirring means. To raise the quantity of the 2,3-dimethylbutenes to 5 mols and the benzene solvent to a desired level, about 273 grams of a fresh charge of 2,3-dimethylbutenes containing about 90 percent by weight of a mixture of the 1 and 2 isomers of 2,3-dimethylbutene and about 93 grams of benzene were added to the flask. The mixture was heated with stirring to a reflux temperature of about 65° C. Then about 750 grams of a crude p-α-dimethylstyrene (88 percent by weight, 5 mols) were slowly added by means of an addition funnel over a period of about three hours with the refluxing temperature rising up to about 81° C. at the completion of the addition. The reaction mixture was then refluxed for about 4 hours to complete the reaction with the refluxing temperature ultimately rising to about 81.5° C. The liquid reaction product was decanted from the catalyst layer to recover about 2072 grams of a liquid product mixture. The mixture was treated with about 5 grams of sodium carbonate and then fractionated under vacuum to recover about 995 grams of a benzene-butene fraction analyzing by G.L.C. as 18.9 percent 2,3-dimethylbutenes or 2.24 mols and about 566 grams of a product fraction analyzing by G.L.C. as 75.6 percent tetrahydronaphthalene or 1.98 mols. The yield of the tetrahydronaphthalene on consumed 2,3-dimethylbutene was, accordingly, 71.7 percent and the conversion was 39.8 percent.

The tetrahydronaphthalene product was recovered from the product fraction by mixing the fraction with about 566 grams of isopropyl alcohol at about 50° C. followed by cooling to 0° C. The solid tetrahydronaphthalene product was then filtered from the alcohol solution and dried to recover about 361 grams of 1,1,3,4,4,6-hexamethyl-1,2,3,4-tetrahydronaphthalene of 99.3 percent purity having a melting point of 65.6 to 66.8° C.

Part B: About 950 grams of a benzene-2,3-dimethylbutene fraction recovered from a prior preparation containing about 20.8 precent of a mixture of the 1 and 2 isomers of 2,3-dimethylbutene and about 35 grams of an activated montmorillonite clay catalyst (Super Filtrol) having a moisture content of about 9.3 percent were charged to a reaction flask equipped with heating and stirring means. To raise the quantity of the 2,3-dimethylbutenes to 5 mols and the benzene solvent to a desired level, about 248 grams of a fresh charge of 2,3-dimethylbutenes containing about 89.6 percent by weight of a mixture of the 1 and 2 isomers of 2,3-dimethylbutene and about 135 grams of benzene were added to the flask. The mixture was heated with stirring to a reflux temperature of about 70° C. Then about 750 grams of a crude p-α-dimethylstyrene (88 percent by weight, 5 mols) were slowly added by means of an addition funnel over a period of about three hours with the refluxing temperature rising up to about 84° C. at the completion of the addition. The reaction mixture was then refluxed for about another hour to complete the reaction with the refluxing temperature remaining at about 84° C. The liquid reaction product was decanted from the catalyst layer to recover about 2083 grams of a liquid product mixture. The mixture was treated with about 5 grams of sodium carbonate and then fractionated under vacuum to recover about 975 grams of a benzene-2,3-dimethylbutene fraction analyzing by G.L.C. as 12.6 percent 2,3-dimethylbutene or 1.46 mols and about 660 grams of a product fraction analyzing by G.L.C. as 80 percent tatrahydronaphthalene or 2.44 mols. The yield of the tetrahydronaphthalene on consumed 2,3-dimethylbutene was, accordingly, 69.1 percent and the conversion was 48.8 percent.

The tetrahydronaphthalene product was recovered from the product fraction by mixing the fraction with about 660 grams of isopropyl alcohol at about 50° C. followed by cooling to 0° C. The solid tetrahydronaphthalene product was then filtered from the alcohol solution and dried to recover the 1,1,3,4,4,6-hexamethyl-1,2,3,4,-tetrahydronaphthalene product having a melting point of 65° to 66.2° C.

I claim as my invention:

1. A process for preparing a polyalkyltetrahydronaphthalene of the formula:

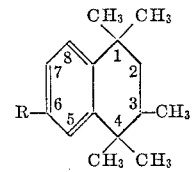

where R is selected from the group consisting of hydrogen and an alkyl radical of from 1 to about 5 carbon atoms which comprises gradually adding an α-methylstyrene substituted in the para position with an R group as defined above to a mixture of a 2,3-dimethylbutene and a catalyst comprising an activated clay maintained at a temperature within the range of from about 70° C. to 85° C. reacting said styrene and butene at said temperature, and thereafter recovering the polyalkyltetrahydronaphthalene product.

2. The process according to claim 1 wherein the styrene compound is p-α-dimethylstyrene and the polyalkyltetrahydronaphthalene produced is 1,1,3,4,4,6 - hexamethyl-1,2,3,4-tetrahydronaphthalene.

3. The process according to claim 1 wherein the catalyst comprises an activated montmorillonite clay.

4. The process according to claim 1 wherein the reaction is effected in the presence of an aromatic hydrocarbon solvent and at the refluxing temperature of the reaction mixture.

5. A process for preparing 1,1,3,4,4,6-hexamethyl-1,2,3,4-tetrahydronaphthalene which comprises gradually adding p-α-dimethylstyrene to a mixture of an olefinic mixture containing 2,3-dimethylbutene-1 and 2,3-dimethylbutene-2, benzene and a catalyst comprising an activated montmorillonite clay maintained at refluxing temperature reacting said styrene and butene compounds at said refluxing temperature, of from about 70° C. to 85° C. and thereafter recovering the hexamethyltetrahydronaphthalene product.

6. A process for preparing 1,1,3,4,4,6-hexamethyl-1,2,3,4-tetrahydronaphthalene which comprises gradually adding p-α-dimethylstyrene to a mixture of an aromatic hydrocarbon solvent, a catalyst comprising an activated montmorillonite clay and an olefinic mixture containing 2,3-dimethylbutene-1 and 2,3-dimethylbutene-2 at refluxing temperature of from about 70° C. to 85° C., maintaining said refluxing temperature until the reaction is complete, and thereafter recovering the hexamethyltetrahydronaphthalene product.

7. A process for preparing 1,1,3,4,4,6-hexamethyl-1,2,3,4-tetrahydronaphthalene which comprises gradually adding p-α-dimethylstyrene over a period of about 1 to 5 hours to a mixture of benzene, a catalyst comprising an activated montmorillonite clay and an olefinic mixture containing 2,3-dimethylbutene-1 and 2,3-dimethylbutene-2 at refluxing temperature within the range of about 70° to 85° C., maintaining the temperature at reflux until the reaction is complete, and thereafter recovering the hexamethyltetrahydronaphthalene product.

References Cited

UNITED STATES PATENTS

| 2,851,501 | 9/1958 | Benz et al. | 260—668 |
| 3,037,052 | 5/1962 | Bortnick | 260—671 XR |
| 3,161,692 | 12/1964 | McLaughlin et al. | 260—669 XR |
| 3,246,044 | 4/1966 | Wood et al. | 260—668 |
| 3,278,621 | 10/1966 | Stofberg et al. | 260—668 |

OTHER REFERENCES

Wood et al.; J. Org. Chem., vol. 28, September 1963; pp. 2248–2255.

DELBERT E. GANTZ, *Primary Examiner.*

C. R. DAVIS, *Assistant Examiner.*